United States Patent [19]

Baker et al.

[11] 4,383,056

[45] May 10, 1983

[54] METHOD OF CONVERTING RESIN SOLUTION TO AQUEOUS DISPERSION

[75] Inventors: Alvin W. Baker; Robert DeVellis, both of Antioch; Patrick H. Martin, Danville; Robin A. Withers, Walnut Creek, all of Calif.

[73] Assignee: The Dow Chemical Company, Midland, Mich.

[21] Appl. No.: 329,379

[22] Filed: Dec. 10, 1981

[51] Int. Cl.$^3$ ............................................. C08L 63/02
[52] U.S. Cl. ................................... 523/328; 523/414; 528/500
[58] Field of Search ....................... 523/328, 402, 414; 524/610; 528/500

[56] References Cited

U.S. PATENT DOCUMENTS 4,128,516 12/1978 Geschonke et al. ................. 523/328
4,289,812 9/1981 Martin ................................. 525/523

Primary Examiner—Theodore E. Pertilla
Attorney, Agent, or Firm—R. R. Stringham

[57] ABSTRACT

Solutions of amine-salified phosphoresins and the free amine in organic solvents are converted to stable dispersions of the salified resins in water by steam stripping under conditions such that at least part of the water is provided as condensed steam.

14 Claims, No Drawings

METHOD OF CONVERTING RESIN SOLUTION TO AQUEOUS DISPERSION

BACKGROUND OF THE INVENTION

U.S. Pat. No. 4,289,812 discloses a method of preparing aqueous resin dispersions in which an epoxy resin is reacted with phosphoric acid and water, the resulting β-hydroxy phosphomonoester groups

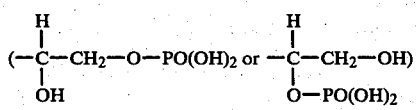

are salified with an amine—ordinarily in excess over the stoichiometric requirement; water is added and the reaction medium is distilled out. Unless the free amine is relatively non-volatile, enough of it may co-distil so that the pH of the final dispersion will drop to such a low level that the resin particles will aggregate and/or deposit on the vessel surfaces, etc. On the other hand, it is also highly desirable not to have a higher final content of free amine than is really essential to the stability of the dispersion.

When the patented process is practiced on a small scale, enough excess amine can be added in the salification step to compensate for the amine removed by co-distillation and satisfactory solvent removal can be attained, without overheating of the dispersion, by transfer of the requisite heat through the walls of the distillation vessel ("kettle" or "pot"). However, when this was attempted on a pilot plant scale, serious degradation of the resin properties occurred; the high ΔT required to achieve adequate heating of the main bulk of the dispersion at practicable stirring rates resulted in overheating adjacent to the kettle wall and consequent excessive amine removal (partially due to a higher degree of dissociation of the amine from the p—OH's in the salified ester groups).

OBJECTS OF THE INVENTION

The main object of the present invention is to strip solvents and free bases from solutions of water-dispersible resins comprising base-salified >PO(OH) groups, in such a manner that the water-dispersibility and other essential properties of the stripped resins are not degraded.

A further object is to simultaneously introduce water to and disperse therein the stripped resin.

An additional object is to provide a stripping method which is rapid enough to permit attainment of high solids contents in the final dispersion without prolonged "cooking" of the resin.

Another object is to provide a stripping method which greatly reduces resin deposition on the interior surfaces of the stripping vessel, stirrer, etc., and largely eliminates the necessity for periodically taking the vessel out of service for (difficult and time-consuming) cleaning.

Still other objects will be made apparent, to those knowledgeable in the art, by the following specifications and claims.

SUMMARY OF THE INVENTION

It has now been discovered that the foregoing objects can be realized by steam-stripping the phosphoresin solution with vigorous agitation and under conditions such that at least a portion of the water required for a final resin dispersion of the desired solids content is provided by steam condensation.

The invention may more narrowly be defined as:

A method of converting to an aqueous resin dispersion a solution of a water-dispersible resin and a steam-strippable, free base in a solvent system comprising a component removable therefrom by steam-stripping, said resin comprising salified PO(OH) or PO(OH)$_2$ groups and the amount of said base being such that removal of said solvent component by steam-stripping will not result in the co-stripping of so much base that a stable, aqueous dispersion cannot be formed from the stripped resin, and said method comprising:

(a) if necessary, adding enough of said base to said resin solution to provide said amount of the free base thereto, (b) optionally, forming a mixture of the solution with water, and (c) agitating said solution while introducing steam thereto, thereby (1) providing liquid water to said solution or mixture, as condensate, (2) removing said solvent component, and (3) forming said aqueous dispersion of the resin.

Meanings of terms

The term "solvent system" is intended to apply to a single solvent or a solvent mixture.

The term "aqueous dispersion" is intended to denote a dispersion in which at least a predominant portion of the continuous phase in water. However, the dispersion may include components of the solvent system which are not removed by the steam under the conditions employed and are otherwise compatible with the water present. Removal of all of the steam-strippable component(s) is not necessarily required, so long as the requisite compatibility results.

By "forming a mixture" is meant placing the resin solution and water in the same vessel, by whatever means—including condensation of steam by introducing it to the solution at a temperature below that at which substantial stripping results.

The term "free" base includes any which may be formed in situ by thermal disruption of the salt groups in the salified, phosphorylated resin.

By a "stable" dispersion is meant one in which the resin particles do not irreversibly settle out or agglomerate to an extent such as to render the dispersion unsuitable for practical utilization.

The term "PO(OH)$_x$ group" is intended to apply to phosphonate

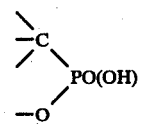

as well as to phosphate

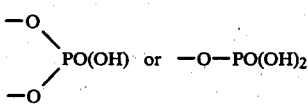

groups. Thus, it is convenient to refer to resins comprising phosphonate and/or phosphate groups as "phospho resins," i.e., as comprising $PO(OH)_x$ groups, where $x=1$ or 2, indpendently in each occurrence.

DETAILED DESCRIPTION

Suitable resins for the practice of the present invention are those resins which (1) comprise $PO(OH)_x$ groups salified with at least one equivalent of a base—which may or may not be the same as the steam-strippable free base present in the solution, and (2) are water-dispersible—with or without the aid of a co-solvent.

Preferably, the $PO(OH)_x$ groups in the resin are comprised in beta-hydroxy phosphomonoester groups deriveable by adduction of ortho phosphoric acid with oxirane groups. Particularly preferred are those resins of the latter class disclosed in the above-referenced U.S. Pat. No. 4,289,812; that is, amine-salified reaction products of the so-called DGEBA-type epoxies with phosphoric acid source materials and water (hydrolysis of higher ester groups cleaves them to hydrolysis-resistant monoester groups and 1,2-glycol groups).

"DGEBA" resins—i.e., polymer mixtures derived from the diglycidylethers of bisphenols and an epichlorohydrin—are conveniently represented by the following ideal formula, in which n corresponds to the average molecular weight of the resin molecules and preferably has a value of from 0 to about 40, R is H or $CH_3$ and Q is the residue of a di(hydroxyphenyl)alkane, such as bisphenol A, for example.

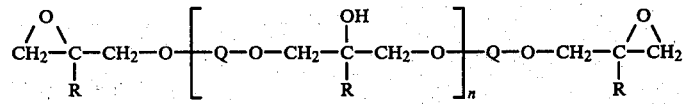

Epoxides of the foregoing formula in which Q is the residue of a dihydroxy benzene are also within the ambit of the invention disclosed in U.S. Pat. No. 4,289,812 and are among those preferred for the practice of the present invention.

Exemplary of other of the preferred type of phospho resins are those derivable through reactions of "epoxy novolacs" with an ortho phosphoric acid source material. Also preferred are products similarly deriveable from resinous tri(hydroxyphenyl)alkanes; tri(hydroxyphenyl)methane and oligomers thereof, most notably, as disclosed in Canadian Pat. No. 951,370. Other such products are those resins similarly deriveable from methylol- and/or methoxymethyl substituted epoxides, as disclosed in U.S. Pat. No. 4,256,844.

As a further example of suitable epoxy resin/$H_3PO_4$ reaction products may be mentioned the water-dispersible, amine- or ammonium hydroxide-salified products of the latter type disclosed in U.S. Pat. No. 2,723,971. The disclosed resins are prepared from copolymers of allyl glycidyl ether and vinyl cycloalkene oxides and other olefinic compounds such as butyl methacrylate, vinyl chloride or acrylonitrile and reacted (in a ketone, alkanol, glycol ether, dioxane or an aromatic solvent) with at least 1 mole of $H_3PO_4$ per oxirane.

Suitable phosphate resins not derived from oxirane/P—OH adduction are exemplified by those disclosed in U.S. Pat. No. 4,054,617. Novolac-type condensates of bis-phenols, alkyl phenols and an aldehyde are reacted with an alkylene oxide (ethylene oxide, most notably) and the resulting hydroxyalkoxy terminations reacted with a phosphorylating agent such as polyphosphoric acid. The resulting products are soluble in aqueous KOH and presumably would be water-dispersible if salified with a base such as $NH_4OH$ or dimethylethanolamine.

As a further example of suitable phospho resins not derived from epoxies, the phosphate resins disclosed in U.S. Pat. No. 4,259,222 may also be mentioned. These resins are reaction products of phosphoric acid source materials with halogen substituted, oxyalkylated aromatic (or cycloaliphatic) dihydroxy compounds such as benzene dicarboxylic acids, di(hydroxyphenyl)alkanes and dihydroxy benzenes, for example, and may comprise up to 40 oxyalkyl units per ring and up to 100 phosphodiester groups per molecule. The repeating unit in a typical such resin may be represented by the formula

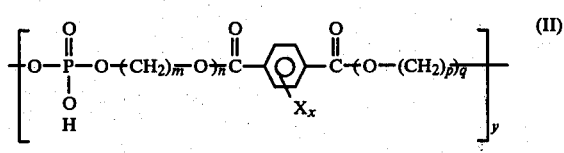

in which X is halogen, x is 1 to 4, m and p are 2–6, n and q are 1 to 10 and y is 2 to 100.

The resins disclosed in the latter patent would be expected—when base-salified—to be dispersible in water.

Suitable non-aromatic phosphate resins are polymeric 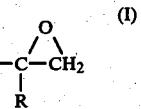 reaction products preparable through the reaction of a polyol and phosphoric acid source material in the presence of an inorganic base, as per U.S. Pat. No. 4,061,695. The latter products can be converted to the corresponding P—OH-comprising resin by acidification with a mineral acid, extracted into a steam-strippable organic solvent and then salified with a steam-strippable base. The resulting salified resins would be expected to be useful for the same purpose as the initially formed inorganic salts, i.e., as scale suppressant additives in heat exchange and cooling tower applications. They should also be useful as dispersants.

Exemplary of suitable phosphonate-functional resins are those deriveable through the reaction of epoxy resins with phosphonic acids of the structure

wherein R is a substituted or unsubstituted hydrocarbyl radical. The latter acids and methods for their synthesis are well known. (The resulting phosphonate resins are believed novel but were not inverted by the inventors of the present stripping method.) The latter resins can be made in essentially the manner disclosed in the above-referenced U.S. Pat. No. 4,289,812 but using a phosphonic acid, rather than phosphoric acid. For the practice of the present invention, R of course will not be so large or so hydrophobic as to render the salified product resin water-incompatible. Preferably, the R radical contains less than ten carbon atoms. Representative of the latter such radicals are phenyl, tolyl, cyclohexyl, allyl, isopropyl and methyl.

It should be noted that in the foregoing definition of R the implied term "substituted hydrocarbyl" is intended to include radicals in which a carbon chain is interrupted by a divalent hetero-radical—such as —O— or —S—, for example—which are not so located or of such a nature as to render the phosphonic acid infeasible of preparation or unable to adduct with oxirane groups.

Suitable solvent systems are those comprising (or consisting of) a solvent that can be stripped from the resin solution by steam—regardless of whether or not that solvent (or the solvent system) is miscible with water. That is, practice of the present method is not limited to "steam distillation" in the classical sense of the term (see Vogel: A Textbook of Practical Organic Chemistry; Longmans, Green & Co., N.Y., 1948; pages 12–16.

Thus, in application of the method to a preferred type of resin solution, the solvent system is a mixture of $CH_2Cl_2$ (essentially water-immiscible) and acetone (perfectly water-miscible). (The $CH_2Cl_2$ comes off largely first, not only by reason of its lower boiling point and the steam-distillation effect but also because the water (introduced as such or by condensation) acts as a solvent for the acetone and reduces its effective vapor pressure. The acetone is then simply distilled off by the heat (latent and sensible) transferred to it from additional steam and condensate.)

Of course, the solvent system must also be able to dissolve the resin (and preferably also the free base, since the resin is usually salified while dissolved).

Another obvious desideratum is that the solvent system is "inert," i.e., does not detrimentally react with the resin, base or water to an intolerable extent.

As indicated earlier herein (with regard to resins of the type disclosed in U.S. Pat. No. 2,732,971), salification and inversion of phosphate resins dissolved in water-immiscible solvents (aromatics, such as xylene, for example) is feasible. Advantageously, however, the solvent system at least includes a water-miscible component, since this makes inversion (to a dispersion of the salified resin in water) easier. Preferably, the latter component is less readily stripped out than the water-immiscible components of the system, so that the character of the system becomes gradually more favorable to a smooth inversion as the stripping operation proceeds.

The combination of $CH_2Cl_2$/acetone, in a weight ratio of from about 20/80 to about 28/72, is particularly fortuitous in the latter regard. Similar solvent systems would be $CH_2Cl_2$, $CHCl_3$ or benzene with methyl ethyl ketone, "glyme" (the dimethyl ether of ethylene glycol, isopropyl alcohol, dioxane or "diglyme" (the dimethyl ether of diethylene glycol).

When the water-miscible component is suitable as a co-solvent in the final dispersion, it may advantageously be so high-boiling as not to be readily stripped out with (atmospheric) steam.

In any case, the suitability of any given solvent system may readily be estimated by (1) checking the solubility of the phosphate resin in it, and (2) subjecting it (sans resin) to steam-distillation (optionally in the presence of a high-boiling, water-miscible, additional solvent). Those skilled in the art require no further guidance in this respect.

Suitable bases for removal by the present method from the salified phospho resin are those otherwise suitable bases which (a) are soluble in the solvent system (or mixture thereof with water), and (b) can be stripped out of the resin/solvent/water system with steam.

For a detailed exposition of other requirements for bases to be employed for salification of epoxy resin/$H_3PO_4$ reaction products, see U.S. Pat. Nos. 2,723,971; 4,164,487 and 4,289,812.

Ordinarily, the free base in the resin/solvent system will simply be an excess of the same base present in the form of the salified phosphoester groups. However, as indicated earlier herein, this is not a necessity. For example, a resin may be salified with a strong base—such as NaOH or choline—the presence of which in free form may be intolerable; yet, a need for some free base, which can be satisfied by a weaker or more oleophilic base such as an amine, may exist during the period required for removal of a steam-strippable component of the solvent system prior to inversion. (Prior to inversion, the system will often constitute a dispersion of water in the resin solution.) Similarly, the resin may be salified with one type of tertiary amine (dimethyl ethanolamine, for example) but also comprise as a free base a different type of tertiary amine (triethyl amine, for example).

In the practice of the present invention with the most preferred resins (reaction products of about 1 phr (1 part per hundred of resin) of 85% $H_3PO_4$ with an epoxy resin of Formula I in which n has a value of from about 10 to about 13), the free base preferably is the same as that present in the salified phospho (mono) ester groups and is triethylamine.

The choice of the free base appropriate to a given resin and solvent system will depend on factors which are discussed in the above-referenced U.S. Pat. No. 4,289,812. Practice of the present invention starts with a resin in which the phospho groups are already salified and—usually—with a solution in which the free base is the same as that used for the salification. In the event, however, that a different free base is to be added, the aforementioned factors should be considered.

The amount of the free base which should be present when steam introduction is commenced (or thereafter), so as to ensure that appropriate pH conditions will prevail during and after inversion, can readily be determined without undue experimentation. The free base content of the solution to be stripped is determined and then an aliquot of the solution is stripped by the present method until the content of the steam-strippable component has been reduced to the desired level. The resulting bottoms product is examined as to pH, base content and dispersion quality. If the base content appears unnecessarily high, more of it may be removed by further steam stripping (adding back some of the strippable solvent component if necessary) or another aliquot diluted with more of the strippable solvent component and stripped to the same final content of the latter component, etc. Similarly, if the final base content appears to be too low, the base content of another aliquot may be augmented before it is stripped to the same final solvent composition, etc. (Of course, the need for such trial and error experimentation can be minimized by estimations based on the known properties of the bases and solvents involved and known physical chemical principles, given the guidance of the specific examples herein.)

In the practice of the invention with a solution of the most preferred resin (as identified earlier herein) in an about 1:4 wt./wt. $CH_2Cl_2$/acetone solvent system, it has been found essential to the stability of the final dispersion to ensure that the pH of the aqueous bottoms does not drop below about 7.5. This pH corresponds to an overall amine to phosphorus ratio of about 1.3 to 1, (which in turn requires the presence of free base in increasingly larger amounts at successively earlier stages in the stripping operation). Attainment of a desirably small average particle size in the product dispersion requires that the free base content of the mixture at the onset of inversion be such that the pH (of the aqueous phase) is from about 9.5 to about 10.5. It has been found that both of the foregoing pH requirements can be met if the content of free base in the starting solution is at least 2 equivalents (2 molecules of triethylamine, for example) per salified phosphoester group or $H_3PO_4$ molecule. Thus, the overall base to phosphorous ratio in the salified resin solution should be at least 3.3 to 1. Increasingly better results are obtained at higher ratios, up to about 6.5. Ratios of 6.6 or even higher can be employed, but generally result in no further improvement.

It will be recognized that, if desired, some amine (or other free base) could be returned to the kettle while the solvent component is being stripped out. The foregoing definition of the invention is not limited to adjustment of the free base content prior to initiation of steam stripping.

It has been found that when the solvent system is $CH_2Cl_2$/acetone, the amine is triethylamine, and the amount of water added (as such and/or as condensate) corresponds to a final solids content of about 50 wt. %, the dispersion will have the desired pH (~7.5) if stripping is terminated at a particular kettle temperature which varies somewhat with the specific batch of phosphorylated resin used. This holds generally true even though the amount of the free base initially present is varied; more base simply requires more stripping before the cut-off temperature is reached (and results in a correspondingly greater amount of water in the (condensed) overhead). See Examples 1, C and D herein.

In the case of the most preferred resins (as above identified), the amine employed for salification is introduced before any substantial amount of water (other than that already present in the phosphorylation mixture) is added. However, the opposite sequence is not ruled out for other resins and may even be essential to efficient salification of any resin if a base such as NaOH—which is generally insoluble in organic solvents—is used for that purpose.

Suitable water contents in the starting solution (or mixture) vary with the particular resin present and on the stripping conditions employed. In the case of the preferred resin systems referred to in the previous two paragraphs, it is essential to add some water before introducing steam to the system. The balance of the water required for the final dispersion can be added largely by steam condensation if the starting mixture is not preheated before steam introduction; in this event, an initial water content of about 25 wt. % will suffice for achievement of an adequately small particle size (for spray applications) in the product dispersion. However, if the starting mixture will be preheated, the initial water content should be about 45 wt. % for best results.

For other resins (and/or solvent systems), the optimum initial water content will have to be determined by trial and error but this is not seen as requiring undue experimentation on the part of those knowledgeable in the art.

Good agitation is essential to efficient steam utilization, uniform heating throughout the mass of the kettle contents and avoidance of resin coagulation or clumping. That is, the degree of mixing (and the steam rate) should be such that the temperature of the mixture adjacent the steam inlet is not more than about 15° C. higher than the temperature adjacent to the vessel wall; a differential of 5° or less is generally feasible and is highly preferred. The stirring (or pumping) rate required to attain such mixing will vary with the viscosity of the mixture, the impeller shape and the degree of baffling.

For reasons obvious to those skilled in the art, resin solutions are generally prepared at as high a "solids" (or non-volatiles) content as is feasible. Consequently, such solutions are often fairly viscous and become more so as they are stripped. Nevertheless, adequate stirring for the present method can be achieved—without excessive power consumption—in standard, plant scale kettles, such as the widely used Pfaudler vessels. (Hot water or atmospheric steam (at a low rate) may be passed through the "jackets" generally included with such vessels to preheat the resin solution—thereby reducing its viscosity to at least a minor extent before initiation of steam stripping.) See Example E herein.

Suitable temperatures and pressures will generally be apparent, according to the boiling points and molecular weights of the solvents to be removed, the presence or absence of solvents which will remain with the resin, etc. The use of super-heated steam or operation at other than ambient pressures is not ruled out. However, atmospheric (saturated) steam and ordinary ambient pressures are contemplated for the general practice of the present invention. For the most preferred resin/base/solvent system, the final pot temperature resulting in a pH of about 7.5 is generally within the range of from about 80° to about 99° C. (at atmospheric pressure).

The following examples are for purposes of illustration and are not to be construed as limiting the present invention in a manner inconsistent with the claims appended to these specifications.

LABORATORY RUNS

After the feasibility and advantages of steam-stripping had been demonstrated on a smaller scale, semi-plant scale tests were carried out in a 300 gallon Pfaudler kettle. The average resin particle sizes in the dispersions formed in the latter tests were inconsistent and generally undesirably large. Also, clumping and deposition of the resin occurred. This prompted a more careful examination of several of the process variables in the laboratory.

In order to simulate as nearly as practical the conditions in the semiplant, the size of the kettle, the batch size and the shape and size of the impeller were scaled down accordingly. Stirring rates were calculated which would give about the same degree of mixing.

Stipping was done with 1000 g of the resin solution in a four-liter, rounded-bottom, generally cylindrical, 5"×14" resin kettle using a single baffle and three different types of stirrers. One was a curved Teflon blade attached to a glass rod. The second was a simple three-toed crow's foot while the third was a double turbine, each level of which had three blades with 90° pitch. The latter two stirrers were of stainless steel and all were sized to approximate the geometry (and stirring) in the semiplant stripper.

Steam was throttled at a metered rate into the stripping kettle from a 30-lb. steam line. At the point where steam (saturated) entered the resin, the temperature was within a degree or two of 100° C. (Saturated steam at 1 atm = 100° C.)

Steam was injected into the resin at either of two levels. For the Teflon paddle, which nearly spanned the bottom of the flask, steam entered the solution at about the midpoint top-to-bottom. The other two paddles had smaller diameters which allowed the steam tube to inject steam just above the kettle bottom. Foam generation was very different for these two conditions, being lowest with the midpoint injection.

The jacket of the resin kettle was electrically heated and thermostatically controlled for most of the experiments to simulate the steam heated reaction vessel in the semiplant. At no time could the external surface of the kettle be raised above 80° C. by heat input from the jacket.

Steam injection was through a glass tube inserted from the top. Some coagulation on its surface resulted from prolonged heating at 100° C. in contact with the resin solution. (This possibly could have been prevented by using a vacuum jacketed steam tube, but this was not considered necessary.)

Low speed stirring was accomplished by means of a geared-down electric stirrer, while an air stirrer was used for the high speed studies (>150 rpm). No stirring problems were encountered because of changes in viscosity during the process of inversion.

The semiplant agitator system was modeled in the laboratory. This involved making a retreat curve impeller having the same ratio of impeller diameter to tank diameter (0.72) as in the 300 gallon kettle. The resin kettle had a radius of 2.5", thus dictating a stirrer with 1.8" arms. The depth of the liquid in the semiplant tank, which was approximately equal to the tank diameter of 50", was scaled accordingly (5"). This ensured the proper positioning of the lab impeller with respect to the position of that in the semiplant.

The impeller speed (rpm) required in the laboratory set-up to simulate the mixing given by the available speed settings in the plant was determined from proprietary correlation data. A speed of 163 rpm was calculated to be equivalent to a plant speed of 40 rpm, while 426 rpm was needed to compare with the 120 rpm plant setting.

The resin solution employed in all of the following examples, except Example A, was prepared in the manner disclosed in U.S. Pat. No. 4,289,812, by the reaction of about 1 phr of 85% aqueous phosphoric acid with an epoxy resin of the foregoing Formula I (n being about 10-13, Q being derived from bisphenol A and R being H) dissolved in $CH_2Cl_2$/acetone (about 27/73 wt. ratio), followed by salification with triethyl amine. Prior to salification, the solution had a viscosity of 662 Poises and contained 48% by weight of non-volatiles. The contents in the solution—in millimoles per gram of non-volatiles—of phosphomonoester, phosphodiester and free $H_3PO_4$ were, respectively, $9.03 \times 10^{-2}$, 0.0 and $0.94 \times 10^{-2}$.

The ultimate goal of the tests was to determine the plant scale conditions required to produce an aqueous dispersion having a pH at which it is stable, a non-volatiles content of about 50 wt. % and an average particle size of about 1500 Å or less.

EXAMPLE A

Effect of stirring rate at "standard" laboratory conditions

The resin employed in this experiment was essentially the same as the above described resin but had a viscosity of 460 Poises, a solids content of 46%, a monoester content of $8.92 \times 10^{-2}$ m.moles/g solids, a diester content of $0.165 \times 10^{-2}$ m.m/g and a free $H_3PO_4$ content of $1.02 \times 10^{-2}$ m.m./g.

The resin was salified with 4.5 phr (~4.5 moles/P atom) of triethylamine and the resulting solution pre-mixed with 25 phr of water. Starting with the resulting mixture at room temperature, steam was introduced at the same rate (~4.2 grams/minute) for each of three runs made at different stirring rates, using the above-described TEFLON (trademark of E. I. duPont de Nemours and Co.) stirrer blade. The conditions and results for the three runs (each terminated at a pot temperature of 99.2° C.) are given in Table 1.

TABLE 1

| | EFFECT OF STIRRING RATE ON DISPERSION PARTICLE SIZE | | |
|---|---|---|---|
| Run | Stirring Condition | Average Particle Size[1] | % $H_2O$ in Overhead |
| 1 | Blade not moving | 1960Å | 32 |
| 2 | Intermittent, eratic | 1690 | 19 |
| 3 | Fully stirred; 100 RPM | 1470 | 11 |

Note:
[1]Determined as described in U.S. Pat. No. 4,289,812

It will be seen that the particle size decreased and more efficient steam utilization resulted from better stirring. This was verified in a number of additional runs at 40 rpm and 100 rpm, the steam being introduced at a higher rate (6-7 g/min.).

EXAMPLE B

Effect of amount of water introduced prior to stripping

Runs 4-6, following, were made with the TEFLON paddle at 100 RPM, whereas the crow's foot stirrer was used in run 7—at a rate, 432 RPM, judged visually to give the same degree of mixing as in the other three runs. Each of Runs 4-6 was started at a pot temperature of 55° C., whereas Run 7 was started at 22° C. The amounts of water added before steam introduction, and the results, are given in Table 2.

TABLE 2

| | EFFECT OF PRE-STRIP WATER CONTENT ON PARTICLE SIZE | | | |
|---|---|---|---|---|
| Run | phr Water | Starting Temperature | Average Particle Size | Final % Solids |
| 4 | 45.0 | 55° C. | 1580Å | 52 |
| 5 | 40.2 | 55 | 1650 | 52 |
| 6 | 32.6 | 55 | 1800 | 53 |
| 7 | 25.0 | 22 | 1635 | 51.4 |

It will be seen that the particle size in the dispersion produced in Run 7 was substantially lower than would have been expected from the results of Runs 4-6, considering the lower pre-strip water content in Run 7. However, this is attributed to the additional water introduced during warm-up, as condensate, in the latter run.

EXAMPLE C

Effect of free base content

A series of five runs was carried out, starting with a mixture comprising 45 wt. % of water and preheated to 55° C. The amounts of triethylamine employed for salification varied as noted in Table 3.

TABLE 3

EFFECT OF FREE BASE CONTENT

| Run | Initial phr of Amine Total | Initial phr of Amine Free[1] | Average Particle Size | % Water in Overhead |
|---|---|---|---|---|
| 8 | 2.40 | 1.10 | 2240Å | 11.8 |
| 9 | 3.50 | 2.20 | 1860 | 15.5 |
| 10 | 4.50 | 3.20 | 1780 | — |
| 11 | 4.75 | 3.45 | 1600 | 16.0 |
| 12 | 6.50 | 5.20 | 1370 | 19.0 |

Note:
[1] A final pH of about 7.5 corresponds to about 1.3 molecules of amine per $PO(OH)_2$ group. Assuming that all of the base at this ratio is effectively associated with the acid functions in the resin (and free $H_3PO_4$), the "free" base is then taken to be the total initial base content, less 1.3.

Since the final base content is essentially the same in each run, it is apparent that the effect of the free base content on particle size is exerted before the final composition of the system is reached. Presumably, the effect is largely exerted at the point where inversion occurs. (See Example E; pH=10 at start of inversion.)

EXAMPLE D

Effect of stirrer configuration

A series of three runs at different stirrer speeds, starting with 45% water and 4.75 phr of triethylamine, was made with the crow's foot stirrer. The speeds and results are given in Table 4.

TABLE 4

EFFECT OF RPM ON PARTICLE SIZE, USING CROW'S FOOT STIRRER

| Run | Actual RPM | Equiv. Plant RPM | Average Particle Size | % $H_2O$ in Overhead |
|---|---|---|---|---|
| 13 | 90 | — | 1665Å | 26.3 |
| 14 | 165 | 40 | 1630 | 26.8 |
| 15 | 432 | 120 | 1565 | 15.4 |

For reasons which are not apparent, a pH of 7.5 was attained at a pot temperature of 80.5°–81° C., in each run. Because of this and by reason of the other differences involved, firm conclusions cannot be drawn as to the effects of using a crow's foot stirrer, as compared to the blade stirrer used in Example A. (The crow's foot stirrer most nearly duplicates the stirrer in the 300-gallon Pfaudler kettle but the baffling in the latter kettle is much more effective.) At least, however, the effect of better mixing (higher RPM) on particle size shown in Table 4 is the same as that shown in Table 1.

A similar test with the turbine-type stirrer also gave no improvement over the blade-type stirrer.

SEMIPLANT RUN

As a result of the preceding tests, the stirring speed control on the Pfaudler agitator was checked and found to be defective. When this was corrected and set at 120 RPM, the results obtained in the laboratory could be essentially duplicated in the semiplant. That is, particle sizes of 1500 Å or less could then be attained when the value of the other main process variables were essentially according to the results in the preceding Tables 2 and 3. A typical semiplant run is described in the following example.

EXAMPLE E

Large scale operation of the process

A "300-gallon" Pfaudler vessel (actual capacity ~450 gallons) is charged with a resin solution of the following composition: phospho resin, as per Example A, 1262.5 lbs.; $H_3PO_4$, 12.5 lbs.; $CH_2CL_2$, 351 lbs.; Acetone, 950.1 lbs.; and $H_2O$, 21 lbs. ($CH_2Cl_2$/Acetone wt. ratio = ~27/73.) To this charge is added, with stirring at 120 RPM and over a 30-minute period, 81.25 lbs. (6.5 phr) of triethylamine. 54.21 lbs. more of water (total 568.5 lbs., or 45+ phr) is then added slowly and the resulting mixture brought to a temperature of 55° C. by jacket heating. Jacket heating is terminated and the jacket drained. Steam (throttled to a little above atmospheric pressure from ~150 psig) is then injected (with 120 RPM agitation) at an average rate of about 902.3/5=180.46 lbs./hr. for 5 hours. As the solvents (and amine) come off and are condensed, (together with a final total of 190.3 lbs. of steam), the pot temperature rises and attains a value of 60° C. after about 2.5 hours. Inversion starts at about this time and is essentially complete in another hour (temperature about 65° C., pH about 10). Thereafter the proportion of amine in the overhead increases and the pH of the kettle contents drops. At the end of the 5 hours, the pH is 7.5, the pot temperature is about 98° C., the % non-volatiles (phosphoresin + $H_3PO_4$ + bound amine is 50% and the average resin particle size is 1500 Å or less.

It should be noted that it is necessary to operate at a steam rate well below the average rate (for the stripping operation, overall) until inversion is essentially complete. Otherwise, substantial carry-over of the resin in the vapor stream exiting the kettle results. Thus, in runs typified by that described above, an insulated demister or foam-breaker (a surge tank 3' in diameter, 4' high and packed with 1.5" stainless steel Pall rings) installed between the kettle and the condenser was employed and the pressure at the exit of this tank (the pressure drop in the line between the tank and the condenser) was a useful criterion of steam rate. That is, it was rapidly learned by experience that resin carry-over could be avoided by holding the steam rate at a level such that the surge tank exit pressure did not exceed a certain value (about 0.5 psig, for example).

What is claimed is:

1. The method of converting a solution of a water-dispersible, salified phosphoester resin to an aqueous dispersion of said resin which comprises steam-stripping said solution with vigorous agitation and under conditions such that at least a portion of the water required for the desired final solids content is provided by steam condensation.

2. The method of claim 1 wherein:
said solution comprises a steam-strippable free base and a solvent component removeable by steam stripping,
said phosphoester groups are >PO(OH) or —PO(OH)$_2$ groups and the amount of said free base is such that removal of said solvent component by steam stripping will not result in the co-stripping of so much base that a stable, aqueous dispersion cannot be formed from the stripped resin, and
said method also comprises:
a. if necessary, adding enough of said free base to the solution to be or being stripped to provide said amount of that base,
b. optionally, forming a mixture of said solution with water, and
c. by introducing said steam, to said solution or mixture, thereby simultaneously
 (1) providing liquid, water to said solution or mixture as condensate,
 (2) removing said solvent component and
 (3) forming said aqueous dispersion of the resin.

3. The method of claim 2 wherein said free base is an amine.

4. The method of claim 3 wherein the base present in the salified phosphoester groups is the same as said amine.

5. The method of claim 2 wherein said phosphoester groups are —PO(OH)$_2$ groups.

6. The method of claim 5 wherein said phosphoresin is deriveable by the reaction of aqueous phosphoric acid with an epoxy resin of the formula

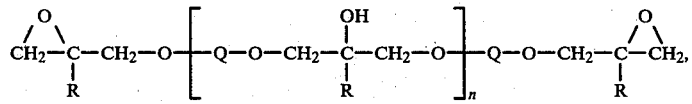

where Q is the residue of dihydroxy benzene or a di(hydroxyphenyl)alkane, R is H or —CH$_3$ and n has a value of from 0 to about 40.

7. The method of claim 2 wherein said phosphoester groups are phosphonoester

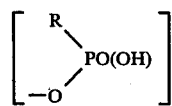

groups, wherein R is a substituted or unsubstituted hydrocarbyl radical.

8. The method of claim 6 in which n has a value of from about 10 to 13.

9. The method of claim 8 wherein said free base is an amine and said solvent system is a CH$_2$Cl$_2$/acetone solution in which the weight ratio of CH$_2$Cl$_2$ to acetone is within the range of from about 20/80 to about 28/72.

10. The method of claim 9 in which said amine is the same as the base present in the salified phosphoester groups and is triethylamine.

11. The method of claim 10 in which the CH$_2$Cl$_2$ to acetone weight ratio is about 27/73.

12. The method of claim 10 in which the overall content of triethylamine in said solution is from about 3.3 to about 6.6 molecules per phosphoester group.

13. The method of claim 12 in which said ratio is about 6.5.

14. The method of claim 2 in which said phosphoester groups are β-hydroxy phosphomonoester groups having the formula

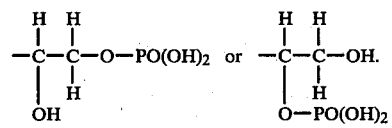

* * * * *

UNITED STATES PATENT AND TRADEMARK OFFICE
CERTIFICATE OF CORRECTION

PATENT NO. : 4,383,056
DATED : May 10, 1983
INVENTOR(S) : A. W. Baker; R. DeVellis; P. H. Martin; R. A. Withers It is certified that error appears in the above—identified patent and that said Letters Patent is hereby corrected as shown below:

Column 1, line 39, delete "p-OH's" and insert -- P-OH's --;

Column 2, line 37, "in" should be -- is --;

Column 4, line 49, "resin" should be plural;

Column 5, line 1, delete "inverted" and insert -- invented --;

Column 5, line 47, the patent number should be -- 2,723,971 --;

Column 12, line 1, delete "A" and insert -- $\overset{\circ}{A}$ --;

Column 12, line 13, delete "$CH_2CL_2$," and insert -- $CH_2Cl_2$, --.

Signed and Sealed this

Thirtieth Day of August 1983

[SEAL]

Attest:

Attesting Officer

GERALD J. MOSSINGHOFF

Commissioner of Patents and Trademarks